B. F. CLOUD.
Device for Transmitting and Arresting Motion.
No. 201,868. Patented April 2, 1878.
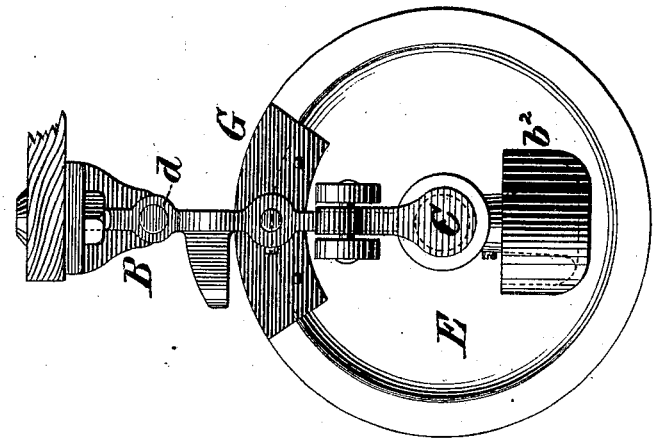
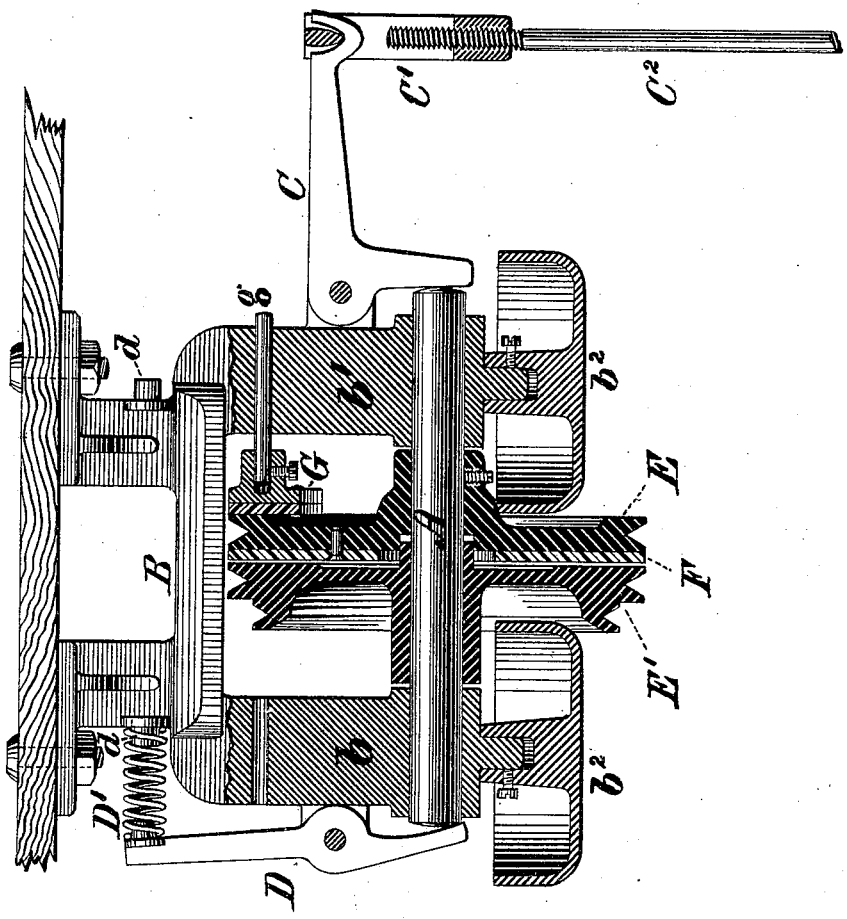

UNITED STATES PATENT OFFICE.

BENJAMIN F. CLOUD, OF PHILADELPHIA, PENNSYLVANIA.

IMPROVEMENT IN DEVICES FOR TRANSMITTING AND ARRESTING MOTION.

Specification forming part of Letters Patent No. 201,868, dated April 2, 1878; application filed March 11, 1878.

*To all whom it may concern:*

Be it known that I, BENJAMIN F. CLOUD, of the city and county of Philadelphia, in the State of Pennsylvania, have invented certain new and useful Improvements in Devices for Transmitting and Arresting Motion, of which the following is a specification:

The object of my invention is to provide simple and efficient means for imparting rotary motion from a pulley which is loose upon a shaft to one fixed thereon, or vice versa, and for arresting the movement of the driven pulley at and during any desired intervals of time, without the employment of a clutch-coupling, or equivalent engaging and disengaging mechanism, for the driving and driven members, respectively.

To these ends my improvements consist in the combination of a supporting frame or hanger; a counter-shaft mounted and having the capacity of end motion in bearings therein, and carrying two pulleys, one of which is loose and the other fixed upon it; a frictional disk secured to one of the pulleys on the side adjacent to the other; a stationary friction-brake secured to the frame adjacent to the driven pulley; and a spring and pivoted levers, by which the driven pulley is moved endwise, so as to be maintained in contact either with the stationary friction-brake or (through the intermediation of the frictional disk) with the driving-pulley, according as it is desired to be at rest or in motion, all as hereinafter more fully set forth.

In the accompanying drawings, Figure 1 is a side view, partly in section, of an apparatus embodying my improvements; and Fig. 2, an end view of the same.

To carry out my invention I provide a counter-shaft, A, which is mounted in bearings in the downwardly-projecting arms $b\,b^1$ of a hanger or supporting-frame, B.

The counter-shaft A has the capacity of end motion in its bearings, and is moved either to the left or to the right, respectively, for a purpose presently to be described—in the first case by power applied to a treadle-rod, $C^2$, connected to a stirrup, $C^1$, which engages the upper arm of a bell-crank lever, C, pivoted to the bearing-arm $b^1$, the lower arm of which lever bears against the right-hand end of the counter-shaft, and in the second by a spring, $D'$, which bears against the upper arm of a double-armed lever, D, pivoted to the opposite bearing-arm $b$, and bearing at or near its lower end upon the left-hand end of the counter-shaft.

The counter-shaft carries a pulley, E, which is made fast upon it, and a loose pulley, $E'$, the latter being, in this instance, the driver, and having grooves formed on its periphery to receive a cord or belt, by which rotary motion is communicated to it from a prime mover.

A frictional disk, F, of leather or other suitable material, is secured upon the side of the pulley E adjacent to the pulley $E'$, and the opposite side of the pulley E (when the shaft A is pressed to the right by the spring $D'$) bears upon a stationary friction-brake, G, consisting of a metallic segment faced with leather, hard wood, or other suitable material, and secured upon a stem, $g$, fitting into a hole in the bearing-arm $b^1$. A similar hole is formed in the arm $b$, and short studs or projecting pins $d$ are formed on each side of the upper part of the hanger. A drip-cup, $b^2$, is formed on or secured to each of the arms $b$ and $b^1$.

The bearings of the levers C and D are similar, and located in similar positions on their respective arms $b^1\,b$, so that the parts may be reversed in position, or turned end for end, if at any time it should be desirable so to do.

The treadle-rod $C^2$ may be connected at bottom to a suitable treadle or to a weight, the distance of which from the stirrup $C^1$ may be regulated, as desired, by a screw-thread on the upper end of the treadle-rod engaging a nut on the stirrup.

In the operation of the device, the loose pulley $E'$ being in rotation, by applying power to the treadle-rod $C^2$ superior to the tension of the spring $D'$, the counter-shaft A and fast pulley are moved to the left and the frictional disk F brought in contact with the loose driving-pulley $E'$, which thereby communicates its movement of rotation to the shaft A and pulley E. Whenever it is desired to arrest the motion of the latter, the power is withdrawn from the treadle-rod, and the spring $D'$, being then free to act, moves the shaft A and pulley E to the right, throwing the frictional disk F out of contact with the driving-pulley E', and coincidently bringing the opposite side of the pulley E into and holding it in contact with the friction-brake G, by which its motion is immediately stopped.

It is obvious that numerous minor changes of construction may be made without departing from the spirit of my invention, which consists in the construction and mode of combining the devices, substantially as hereinbefore set forth, by which the driven pulley is moved into and held in connection with either the driving-pulley or the stationary friction-brake, so that the application of a retarding agent is made coincidently with the withdrawal of the impelling power, and vice versa, by means of the conjoined action of the spring and treadle-rod and their pivoted levers—as, for example, the frictional disk might be secured upon the driving instead of the driven pulley; or the driving-pulley might be fast upon the shaft and the driven pulley loose; or, again, the resistance of a weight might be substituted for that of the spring, according as circumstances or the judgment of the constructer dictate.

My improvements are specially applicable to shoe-sewing machines, in which frequent and sudden stopping and starting of the needle-bar is requisite; but they are suitable to the fulfillment of similar functions in various other mechanical structures.

I am aware that in the patent of R. B. and J. C. Chapman, No. 160,877, March 16, 1875, for reversing mechanisms, there is described and shown a loose driving-pulley combined with two frictional disks, one fastened to the shaft and the other independent of it, and fixed or stationary and intermediate mechanism for reversing the motion. This I therefore distinctly disclaim.

I claim as my invention and desire to secure by Letters Patent—

The combination of a supporting-frame, a counter-shaft mounted and having the capacity of end motion in bearings therein, and carrying a fast pulley and frictional disk, and a loose pulley, a stationary friction-brake secured upon the frame, and a spring and pivoted levers, by which the frictional disk and fast pulley are moved endwise and maintained in contact either with the friction-brake or the loose pulley, substantially as and for the purpose set forth.

BENJAMIN F. CLOUD.

Witnesses:
J. SNOWDEN BELL,
GEO. A. VAILLANT.